United States Patent
Uchida et al.

(10) Patent No.: US 6,188,943 B1
(45) Date of Patent: Feb. 13, 2001

(54) INTEGRATED CONTROL SYSTEM FOR ELECTRONICALLY-CONTROLLED ENGINE AND AUTOMATIC TRANSMISSION

(75) Inventors: Masaaki Uchida; Shusaku Katakura, both of Kanagawa; Katsuhiko Tsuchiya, Yokohama; Hideaki Watanabe, Kanagawa, all of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/083,097

(22) Filed: May 22, 1998

(30) Foreign Application Priority Data

May 22, 1997 (JP) .................................................. 9-132332
Jun. 12, 1997 (JP) .................................................. 9-155377

(51) Int. Cl.[7] ........................... G06F 17/00; B60K 41/04; F16D 67/00
(52) U.S. Cl. ........................ 701/54; 701/56; 477/107; 477/115; 192/3.54; 192/3.61
(58) Field of Search ............................ 701/51, 53, 54, 701/55, 56, 61, 64; 477/43, 107, 109, 110, 115; 192/3.51, 3.54, 3.61, 3.3, 3.31

(56) References Cited

U.S. PATENT DOCUMENTS

| | | | |
|---|---|---|---|
| 4,598,611 | * 7/1986 | Frank | 74/860 |
| 4,955,246 | 9/1990 | Nakano | 74/200 |
| 5,152,386 | 10/1992 | Imamura | 192/75 |
| 5,325,740 | * 7/1994 | Zhang et al. | 477/110 |

FOREIGN PATENT DOCUMENTS

| | | |
|---|---|---|
| 62-110535 | 5/1987 | (JP) . |
| 62-110536 | 5/1987 | (JP) . |
| 5-92732 | 4/1993 | (JP) . |
| 5-263904 | 10/1993 | (JP) . |

* cited by examiner

Primary Examiner—Jacques H. Louis-Jacques
Assistant Examiner—Brian J. Broadhead
(74) Attorney, Agent, or Firm—Foley & Lardner

(57) ABSTRACT

An integrated control system for both an electronically-controlled engine and a steplessly variable automatic transmission, comprises a speed-change ratio arithmetic processing section for calculating the speed-change ratio as a ratio of the transmission input speed to the transmission output speed, a target driving torque arithmetic processing section for retrieving a target driving torque, based on both the accelerator operating amount and the vehicle speed, from a first predetermined characteristic map, and a target speed-change ratio arithmetic processing section for retrieving a target speed-change ratio, based on both the accelerator operating amount and the vehicle speed, from a second predetermined characteristic map. Also provided is a target engine output torque arithmetic processing section for calculating a target engine output torque, based on all of the target driving torque, the speed-change ratio, and a speed ratio of the transmission input speed to the engine speed. Depending on the engine speed and the target engine output torque, the throttle opening and the transmission input speed are both feedback-controlled.

6 Claims, 8 Drawing Sheets

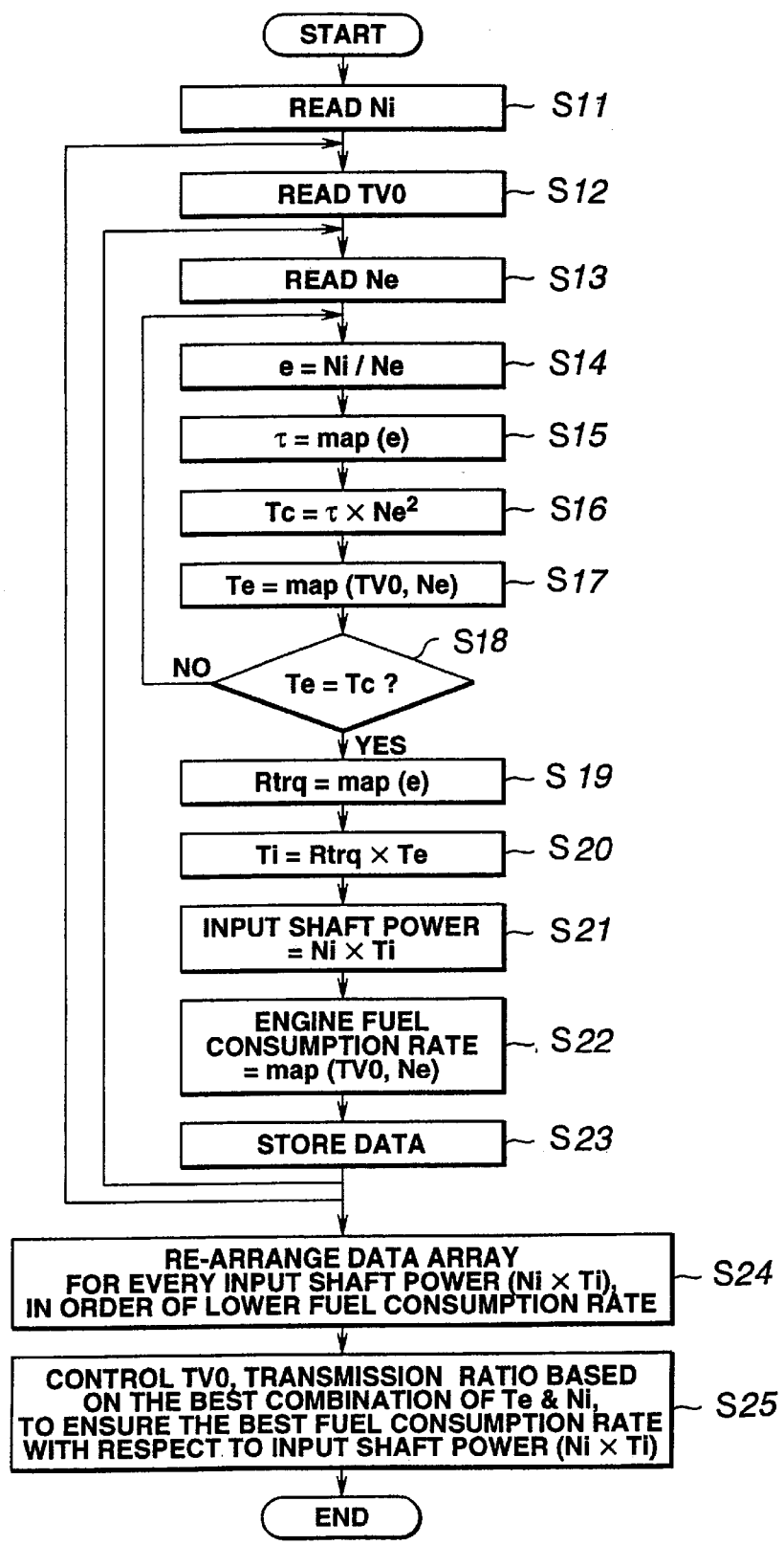

INTEGRATED CONTROL SYSTEM FOR ELECTRONICALLY-CONTROLLED ENGINE AND AUTOMATIC TRANSMISSION

BACKGROUND OF THE INVENTION

1. Field of the Invention

The present invention relates to an integrated control system for an electronically-controlled internal combustion engine and an automatic transmission, and specifically to technologies for optimally balancing two somewhat contradictory requirements, that is, better drivability and improved fuel consumption, while automatically controlling or regulating a driving torque to be transmitted via axle driveshafts to drive wheels and a transmission ratio (or a transmission speed-change ratio) on automotive vehicles with an electronic engine control module (ECM) or an electronic engine control unit (ECU), and an electronic componentry for transmission control, particularly suitable for a steplessly variable automatic transmission.

2. Description of the Prior Art

In recent years, there have been proposed and developed various controllers for an electronically-controlled internal combustion engine and a steplessly variable automatic transmission. More later-model cars with an electronically controlled engine and a continuously variable automatic transmission, require a high-accuracy control for both the driving torque transmitted to drive wheels and the speed-change ratio of the automatic transmission, to balance the better drivability and the improved fuel consumption. For example, Japanese Patent Provisional Publication Nos. 62-110536 and 62-110535 have disclosed controllers for controlling both a driving force (or an engine output torque) and a speed-change ratio of a belt type continuously variable automatic transmission often abbreviated to a "CVT". In the controller disclosed in the previously-noted Japanese Patent Provisional Publication No. 62-110536, a target driving torque is arithmetically calculated on the basis of both an accelerator opening (or an angular position of an accelerator pedal) and a vehicle speed. On the other hand, a target speed-change ratio (or a desired pulley ratio of the CVT) is arithmetically calculated on the basis of the calculated target driving torque and the vehicle speed. The speed-change ratio (the pulley ratio) of the CVT is feedback controlled, so that the actual pulley ratio of the CVT is adjusted toward the calculated target speed-change ratio. Also, a target engine torque (or a target engine output power) is retrieved from a predetermined characteristic map by reference to both the actual speed-change ratio of the CVT and the calculated target driving torque. A desired value of a control variable (e.g., a throttle opening) for a variable engine-torque control actuator, such as an electronically controlled throttle actuator, is retrieved from a predetermined characteristic map by reference to both the retrieved target engine torque and the actual engine speed. The variable engine-torque control actuator, that is, the throttle actuator, is feedback controlled, so that the desired value of a control variable (e.g., the desired throttle opening) is reached. The previously-discussed prior art controller is constructed, so that the target speed-change ratio is retrieved from the predetermined characteristic map by reference to the target driving torque and the vehicle speed. That is, the characteristic map for retrieval of the target driving torque and the characteristic map for retrieval of the target speed-change ratio are mutually related to each other. When the characteristic map of the target driving torque has been altered to properly tune the drivability of the vehicle, the target speed-change ratio retrieved by reference to both the target driving torque retrieved and the vehicle speed, would be changed as a result of alteration of the target-driving-torque characteristic map. As is generally known, the characteristics defined by the target-speed-change-ratio map exert a great influence on fuel economy. As set out above, in the prior art controller as disclosed in the Japanese Patent Provisional Publication No. 62-110536, it is difficult to balance both enhanced drivability and improved fuel consumption, since the target-driving-torque map and the target-speed-change-ratio map cannot be set or altered independently of each other. In addition, in the prior art controller disclosed in the Japanese Patent Provisional Publication No. 62-110536, the target engine torque is retrieved by reference to only two factors, namely the actual speed-change ratio and the target driving torque. Thus, the target engine torque could not be precisely compensated for, depending on engaging and disengaging conditions of a releasable coupling device or an engagement/disengagement device, such as a computer-controlled clutch placed between the engine and the CVT automatically to couple the engine and the CVT at least during vehicle travel and to uncouple them at least during vehicle stand-still. For example, the computer-controlled clutch corresponds to a so-called start clutch (an electro-magnetic clutch) for the CVT or a hydraulically-actuated lock-up clutch employed in a so-called lock-up torque converter capable of engaging automatically to lock the impeller and turbine wheels together to give a direct drive at a predetermined ratio of turbine-to-engine speed. For the reasons set forth above, in the prior art controller, there is another problem of lowering of the accuracy of driving-torque control, when the computer-controlled clutch (the releasable coupling device or the engagement/disengagement device) is disengaged and thus there is the difference of relative speed between input and output shafts of the computer-controlled clutch. On the other hand, the Japanese Patent Provisional Publication No. 62-110535 discloses a driving-torque controller suitable for an automobile power train employing a so-called lock-up torque converter. In the Japanese Patent Provisional Publication No. 62-110535, a target engine output horsepower is arithmetically calculated on the basis of both an accelerator opening and a vehicle speed. A target input-shaft rotational speed of the CVT is arithmetically calculated on the basis of the calculated target output horsepower. The input-shaft rotational speed of the CVT is feedback controlled, so that the actual input-shaft rotational speed of the CVT is adjusted toward the calculated target input-shaft rotational speed through a speed-change ratio control of the CVT. On the other hand, a target engine torque is arithmetically calculated on the basis of both the calculated output horsepower and the actual input-shaft rotational speed of the CVT. The engine output torque is feedback controlled, so that the calculated target engine torque is reached through an engine control, concretely a throttle-opening control. In the controller disclosed in the Japanese Patent Provisional Publication No. 62-110535, there is a problem that the characteristic map for retrieval of the target output horsepower and the characteristic map for retrieval of the target input-shaft rotational speed are mutually related to each other. Thus, these characteristic maps cannot be tuned independently of each other, since the content of one of the two maps is affected by alteration (rewriting) of the content of the other map. Also, the control system disclosed in the Japanese Patent Provisional Publication No. 62-110535, may provide a high-accuracy driving-torque feedback control, effectively reducing a fuel-consumption rate, under a specified condition where the torque converter assumes a full lock-up mode at which there is no difference of relative speed between input and output shafts of the torque converter with the lock-up clutch strongly engaged. However, when the torque converter assumes an open converter mode at which the lock-up clutch is completely released, or a slip lock-up mode at which the lock-up clutch is partially engaged, there are remarkable fluctuations in both the input torque and the output torque of the torque converter, and thereby it is difficult to provide a high-accuracy driving-torque feedback control.

SUMMARY OF THE INVENTION

Accordingly, it is an object of the invention to provide an integrated control system for an electronically-controlled engine and an automatic transmission, preferably a steplessly variable automatic transmission, such as a belt type continuously variable automatic transmission, a toroidal type continuously variable automatic transmission, or the like, which avoids the aforementioned disadvantages of the prior art.

It is another object of the invention to provide an integrated control system for an electronically-controlled engine and an automatic transmission (preferably a steplessly variable automatic transmission), which is capable of setting a target driving-torque characteristic map (contributing to a better drivability of the vehicle) and a target speed-change-ratio characteristic map (contributing to an improved fuel consumption rate) independently of each other.

It is a further object of the invention to provide an integrated control system for an electronically-controlled engine and an automatic transmission (preferably a steplessly variable automatic transmission), which is capable of optimally compensating for a target engine torque, depending on the operating condition (namely, full engagement, partial engagement, or disengagement) of a releasable coupling device (e.g., an electromagnetic clutch or a lock-up clutch), disposed between the engine and the automatic transmission to couple or uncouple them.

It is a still further object of the invention to provide an integrated control system for an electronically-controlled engine and an automatic transmission (preferably a steplessly variable automatic transmission) connectable to the engine via a lock-up torque converter, which can effectively reduce a fuel consumption rate by way of a proper automatic speed-change ratio control combined with an automatic engine output power control (e.g., an automatic throttle control capable of being made to an electronically-controlled throttle), while attaining a target driving torque, even when the lock-up clutch is out of its full lock-up operating mode.

In order to accomplish the aforementioned and other objects of the present invention, an integrated control system for both an electronically-controlled engine and a steplessly variable automatic transmission, comprises an engine-torque control actuator capable of variably adjusting an engine output torque, irrespective of depression of an accelerator, a steplessly variable automatic transmission disposed between the electronically-controlled engine and an axle driveshafts, for steplessly changing a speed-change ratio, an accelerator sensor for detecting an accelerator operating amount, a vehicle speed sensor for detecting a vehicle speed, an engine speed sensor for detecting an engine speed, a transmission input speed sensor for detecting a transmission input speed, a transmission output speed sensor for detecting a transmission output speed, a speed-change ratio arithmetic processing section for calculating the speed-change ratio as a ratio of the transmission input speed to the transmission output speed, a target driving torque arithmetic processing section for retrieving a target driving torque, based on both the accelerator operating amount and the vehicle speed, from a first predetermined characteristic map, a target speed-change ratio arithmetic processing section for retrieving a target speed-change ratio, based on both the accelerator operating amount and the vehicle speed, from a second predetermined characteristic map, a target engine output torque arithmetic processing section for calculating a target engine output torque, based on all of the target driving torque, the speed-change ratio, and a speed ratio of the transmission input speed to the engine speed, an arithmetic processing section for calculating a desired value of a control variable for the engine-torque control actuator, based on the target engine output torque and the engine speed, a first feedback control section for feedback-controlling the engine-torque control actuator, so that the control variable of the engine-torque control actuator is adjusted toward the desired value, and a second feedback control section for feedback-controlling the automatic transmission, so that the speed-change ratio is adjusted toward the target speed-change ratio. It is preferable that the engine-torque control actuator comprises a throttle actuator for changing an angular position of an electronically-controlled throttle, and the control variable is a throttle opening. The steplessly variable automatic transmission may comprise a belt type continuously variable automatic transmission having primary and secondary—driving and driven—pulleys whose effective diameters are continuously changeable, a segmented belt wound on both the primary and secondary pulleys, a driving-pulley hydraulic actuator responsive to a primary pressure for changing the effective diameter of the primary pulley, and a driven—pulley hydraulic actuator responsive to a secondary pressure for changing the effective diameter of the secondary pulley, so that the speed-change ratio is steplessly variable. More preferably, the integrated control system may further comprise an engagement-and-disengagement device disposed between the steplessly variable automatic transmission and the electronically-controlled engine. The engagement-and-disengagement device may comprise an electromagnetic clutch placed between the steplessly variable automatic transmission and the engine automatically to couple the engine and the steplessly variable automatic transmission at least during vehicle travel and to uncouple them at least during vehicle stand-still. Alternatively, the engagement-and-disengagement device may comprise a lock-up torque converter accommodating therein a lock-up clutch. It is preferable that the lock-up torque converter is operable at either one of three operational modes, namely an open converter mode where the lock-up clutch is released, a slip lock-up mode where the lock-up clutch is partially engaged, and a full lock-up mode where the lock-up clutch is fully engaged. Also, the integrated control system of the invention may further comprise a stable operating point arithmetic processing section for detecting a stable combined operating point of an engine output torque and the transmission input speed, at which stable combined operating point a torque difference between the engine output torque and a torque-converter absorbed torque becomes zero, for each combination of the throttle opening and the transmission input speed when the lock-up torque converter operates at either one of the open converter mode and the slip lock-up mode, and a best stable operating point arithmetic processing section for selecting the best stable combined operating point, capable of providing the lowest fuel consumption rate while producing the target driving torque, out of the stable combined operating points detected. The first feedback control section feedback-controls the throttle actuator of the electronically-controlled throttle, so that the engine output torque is adjusted toward a target engine output torque at the best stable combined operating point, whereas the second feedback control section feedback-controls the automatic transmission, so that the transmission input speed is adjusted toward a target transmission input speed at the best stable combined operating point. It is preferable that the best stable combined operating point is selected by virtue of a preprogrammed engine fuel consumption rate characteristic map representative of the relationship among the throttle opening, the engine speed, and the engine fuel consumption rate. The stable combined operating point of the engine output torque and the transmission input speed is derived or obtained as a point of intersection of an engine-speed versus engine output torque characteristic curve and an engine-speed versus torque-converter absorbed torque characteristic curve. As compared to the open converter mode, it is more preferable that the engine-speed versus torque-converter absorbed torque characteristic curve at the slip lock-up mode is increasingly compensated for by a force of engagement of the lock-up clutch of the lock-up torque converter.

BRIEF DESCRIPTION OF THE DRAWINGS

FIG. 5 is a flow chart illustrating one example of a program of an automatic driving torque control and an automatic speed-change ratio control, executed by the integrated control system of the invention, in case that a lock-up torque converter is disposed between the engine and the CVT as an engagement/disengagement device.

DESCRIPTION OF THE PREFERRED EMBODIMENTS

Figure 1:
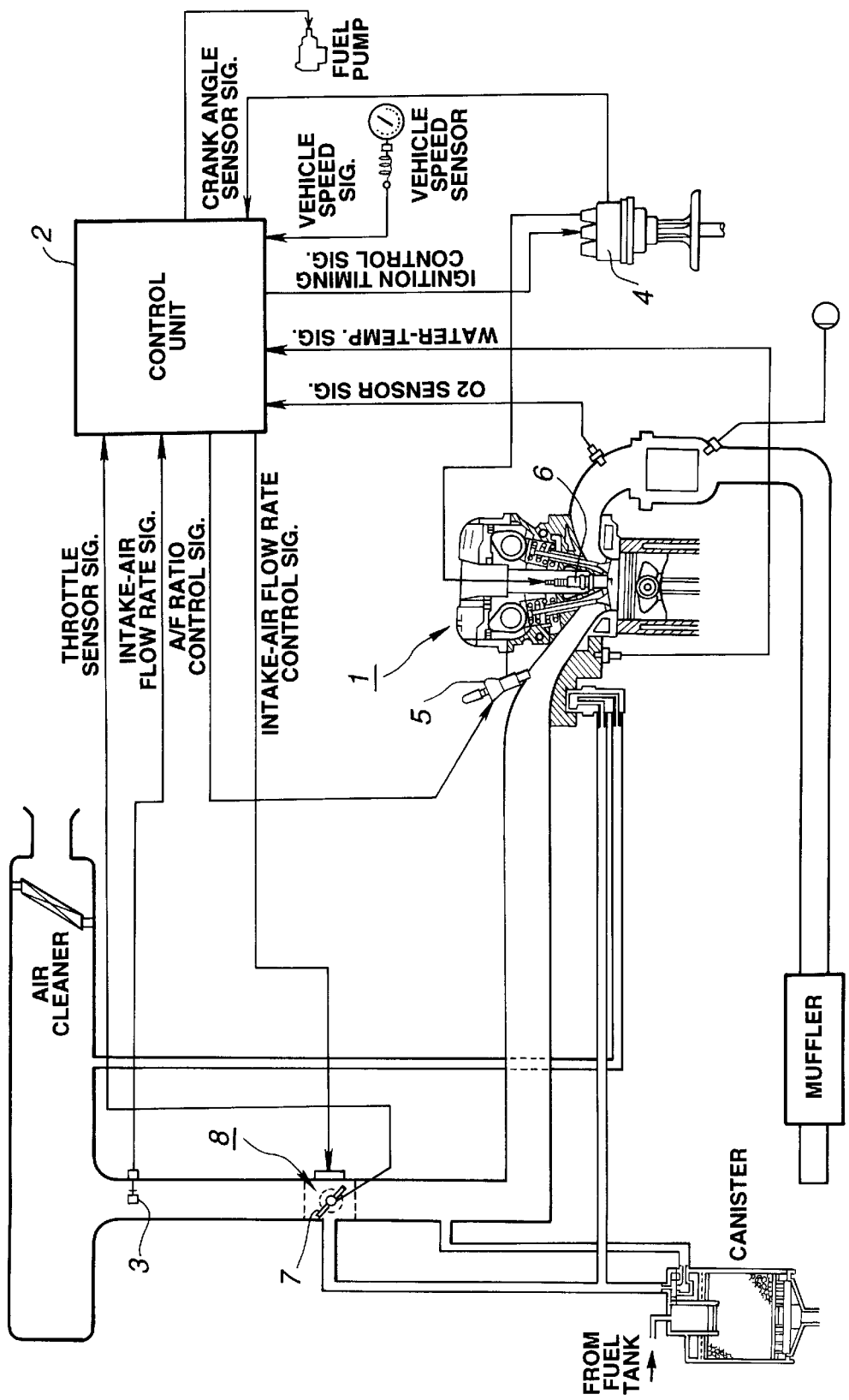
FIG. 1 is a system diagram illustrating one embodiment of an engine control system constructing part of an integrated control system of the invention.
Figure 2:
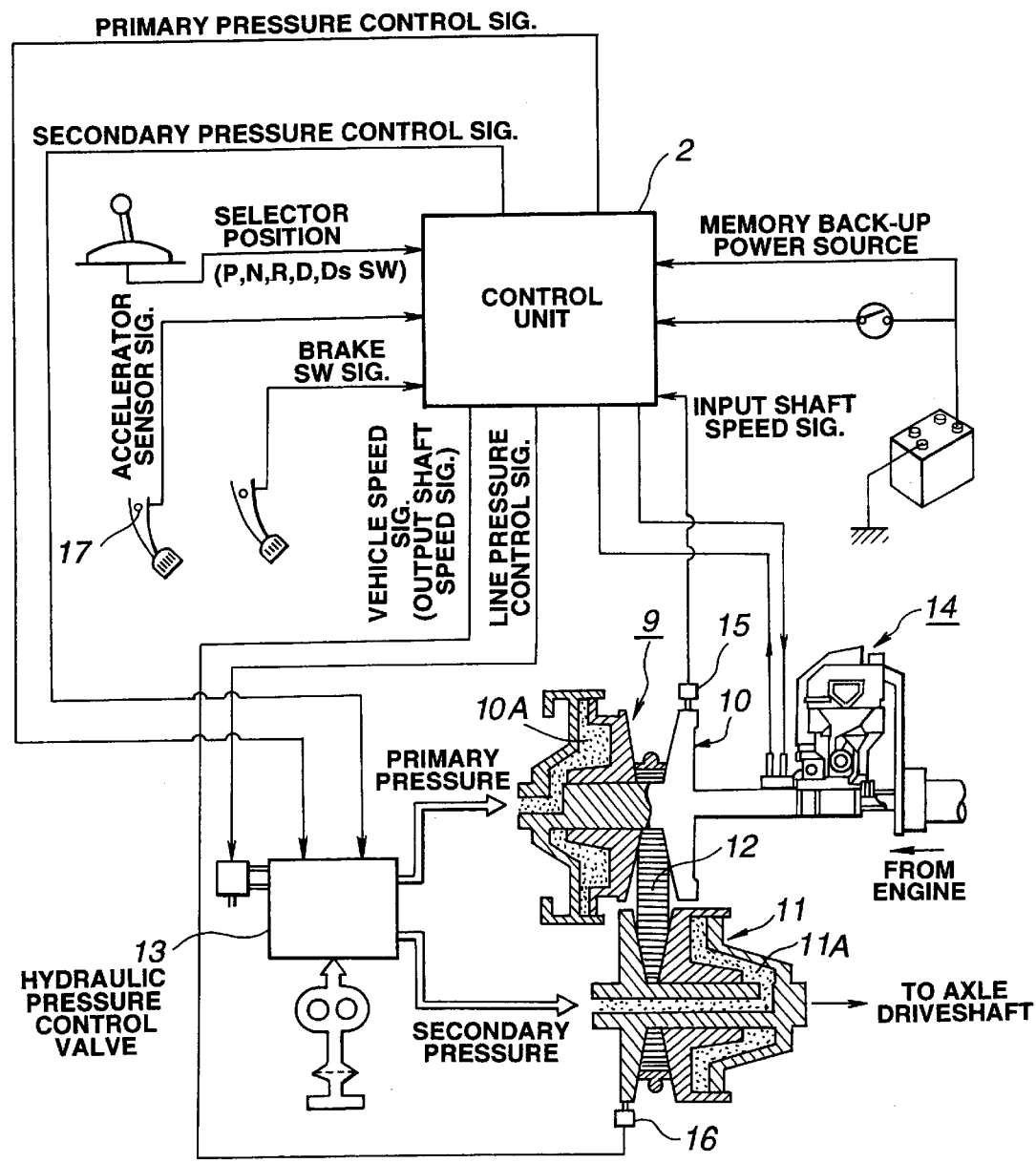
FIG. 2 is a hydraulic system diagram of a steplessly variable automatic transmission control system constructing the remainder of the integrated control system of the invention.

Referring now to the drawings, particularly to FIGS. 1 and 2, the integrated control system of the embodiment comprises an engine control system (or an electronic engine control unit or an electronic engine control module) for electronically controlling an internal combustion engine 1 and an automatic transmission control system for electronically controlling both a continuously variable automatic transmission (CVT) 9 and an engagement/disengagement device (an electromagnetic clutch 14). The integrated control system has a control unit 2 for executing these controls. In a conventional manner, the control unit 2 comprises a microcomputer. As seen in FIG. 1, the input interface of the control unit 2 receives various signals from engine/vehicle sensors, namely an air flow meter 3, a crank angle sensor 4, a coolant temperature sensor (not numbered), a vehicle speed sensor 16 (see FIG. 2), an oxygen sensor ($O_2$ sensor, not numbered), and a throttle sensor (not numbered). The air flow meter 3 generates an intake-air flow rate signal. The crank angle sensor 4 generates a crank angle sensor signal containing a distributor reference signal and a so-called POS signal indicative of a relative angular position of the engine crankshaft. The vehicle speed sensor 16 is usually located near the transmission output shaft to detect the rotational speed of the transmission output shaft. Usually, the rotational speed ($N_o$) of the transmission output shaft is used as a vehicle speed VSP. During a closed loop engine operating mode where the exhaust temperature has risen to within a predetermined temperature range, the voltage signal from the $O_2$ sensor is used by the engine control module (ECM). The throttle sensor is provided near the electronically-controlled throttle 7 to generate a throttle sensor signal indicative of a throttle opening (TVO) which is generally defined as a ratio of an actual throttle angle to a throttle angle obtained at wide open throttle. A fuel injection amount is determined on the basis of the intake-air flow rate signal from the air flow meter 3, and the engine speed $N_e$ and the angular phase of the engine crankshaft both extracted from a crank angle sensor signal generated from the crank angle sensor 4. An ignition timing is determined on the basis of both the engine speed $N_e$ and the engine load estimated from an accelerator opening, for example. Each fuel injector 5 is controlled depending on the fuel injection amount determined, for example through a duty-cycle control, whereas a spark plug 6 of each engine cylinder is fired depending on the ignition timing determined.

An electronically-controlled throttle 7 is disposed in an intake-air passage of an induction system, for electronically controlling the throttle opening (that is, the intake-air flow rate) regardless of depression of the accelerator pedal. Reference sign 8 denotes a throttle actuator for changing the angular position of the electronically-controlled throttle 7. The throttle actuator 8 is able to change the engine output torque, regardless of the depression amount of the accelerator.

Referring now to FIG. 2, the continuously variable automatic transmission (CVT) 9 has primary and secondary —driving and driven—pulleys 10 and 11 whose effective diameters are continuously changeable, and a segmented steel belt 12 wound on both the primary and secondary pulleys 10 and 11. Thus, the output shaft of the CVT 9 is driven by the engine crankshaft connected via an electromagnetic clutch 14 to the input shaft of the CVT by the segmented steel belt 12. A line pressure is compensated for as a secondary pressure by means of a hydraulic pressure control valve unit 13, and then the secondary pressure is fed into a driven-pulley actuation hydraulic actuator 11A of the secondary pulley 11. In addition to the secondary pressure, the hydraulic pressure control valve unit 13 generates a so-called speed-change pressure which is regulated at a predetermined pressure level from the line pressure (the initial pressure). The properly regulated speed-change pressure is fed into a driving-pulley actuation hydraulic actuator 10A of the primary pulley 10. That is, the regulated speed-change pressure is supplied into the driving-pulley actuator 10A as a primary pressure in order for the speed-change ratio ($R_{oi}$) of the CVT to be steplessly variable. The control unit 2 controls the coupling and uncoupling operations of the engine and the CVT, by means of the electromagnetic clutch 14, serving as an engagement/disengagement device (an engagement-and-disengagement device). As seen in FIG. 2, for the purpose of the automatic transmission control, the input interface of the control unit 2 further receives various signals from a brake switch (not numbered), an inhibitor switch (not numbered), an accelerator sensor 17, the vehicle speed sensor (or a transmission output-shaft rotational speed sensor, simply a transmission output speed sensor) 16, and a transmission input-shaft rotational speed sensor (simply a transmission input speed sensor) 15. The inhibitor switch is provided to monitor an operating range (a selector position) selected by a control lever. The accelerator sensor 17 is provided to monitor or detect an accelerator opening (or an accelerator operating amount APS) of the accelerator pedal to generate an accelerator sensor signal indicative of the accelerator opening. In the shown embodiment, the vehicle speed sensor 16 corresponds to the transmission output-shaft rotational speed sensor. The transmission output-shaft rotational speed, simply the transmission output speed ($N_o$) is derived from a value of the signal from the sensor 16. The transmission input-shaft rotational speed sensor 15 is located near the flanged portion of the primary pulley 10, to detect the transmission input-shaft rotational speed, simply the transmission input speed ($N_i$). The processor (CPU or MPU) of the control unit 2 has a speed-change ratio arithmetic processing section for arithmetically calculating a speed-change ratio ($R_{oi}$) as a ratio ($N_i/N_o$) of the transmission input-shaft rotational speed ($N_i$) to the transmission output-shaft rotational speed ($N_o$). The control unit 2 controls both the primary pressure for the driving-pulley actuator 10A and the secondary pressure for the driven-pulley actuator 11A, so that the actual speed-change ratio ($R_{oi}$) is adjusted toward a target speed-change ratio ($tR_{oi}$). In the previously-discussed embodiment, although the electromagnetic clutch 14 is used as an engagement/disengagement device for coupling or uncoupling the CVT and the engine, in lieu thereof a lock-up clutch of a lock-up torque converter may be used as the engagement/disengagement device. An example of the use of a lock-up torque converter is indicated in FIGS. 5 to 10, and will be fully described later by reference to FIGS. 5–10.

Figure 3:
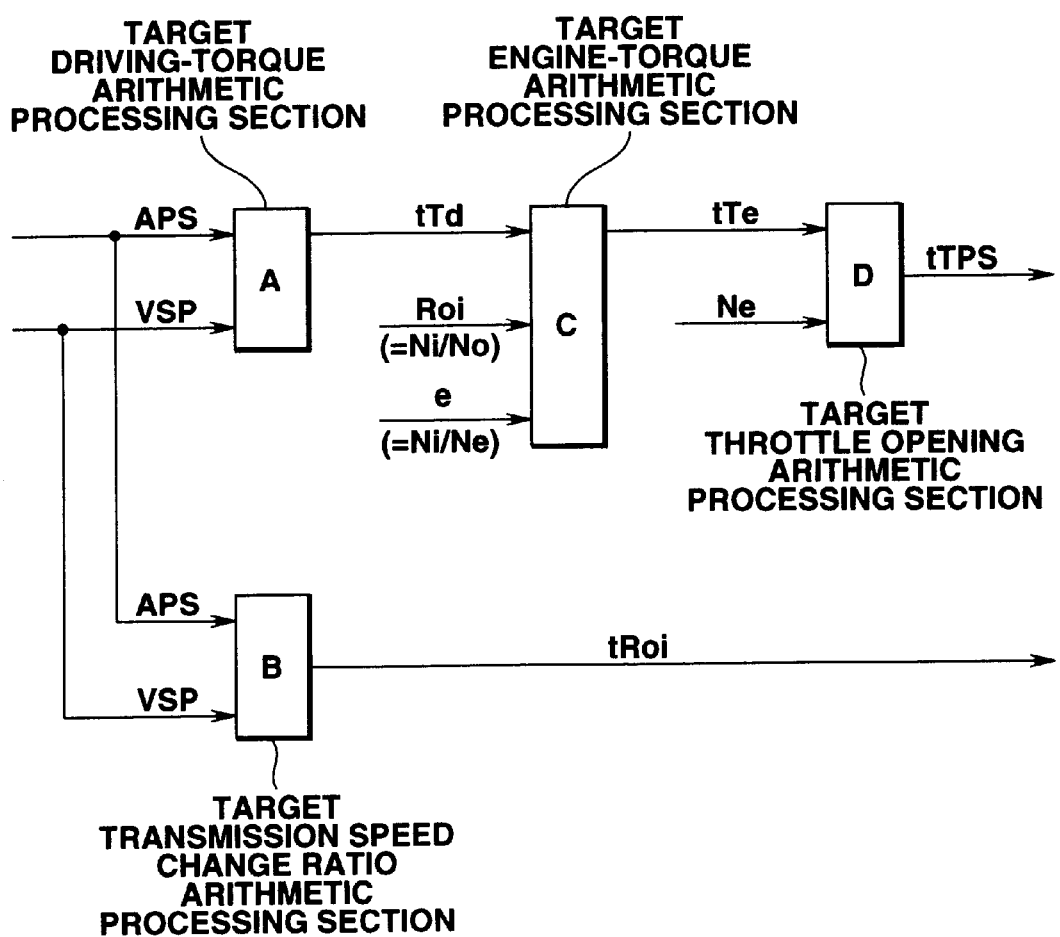
FIG. 3 is a block diagram illustrating several functions of a processor contained within a control unit 2 shown in FIGS. 1 and 2 and employed in the integrated control system of the embodiment.

Referring to FIG. 3, there is shown a block diagram explaining details of arithmetic calculations performed by an arithmetic processing section (the processor) of the control unit 2. The arithmetic processing section of the control unit 2 comprises a target driving torque arithmetic processing section A, a target speed-change ratio arithmetic processing section B, a target engine torque arithmetic processing section C, and a target throttle opening arithmetic processing section D. The target driving torque arithmetic processing section A receives a signal indicative of an accelerator operating amount APS (the accelerator opening) from the accelerator sensor 17, and a vehicle speed indicative signal VSP from the sensor 16. The arithmetic processing section A arithmetically calculates or retrieves a target driving torque $tT_d$ from a first preprogrammed characteristic map representative of the relationship among the accelerator operating amount APS, the vehicle speed VSP, and the target driving torque $tT_d$, on the basis of the two input signal values APS and VSP. Similarly, the target speed-change ratio arithmetic processing section B receives the same input information, namely the accelerator operating amount APS and the vehicle speed VSP. The arithmetic processing section B arithmetically calculates or retrieves a target speed-change ratio $tR_{oi}$ from a second preprogrammed characteristic map representative of the relationship among the accelerator operating amount APS, the vehicle speed VSP, and the target speed-change ratio $tR_{oi}$, on the basis of the two input signal values APS and VSP. As previously described, the actual speed-change ratio $R_{oi}$ is defined or calculated as a ratio ($N_i/N_o$) of the transmission input-shaft rotational speed ($N_i$) to the transmission output-shaft rotational speed ($N_o$). The target engine torque arithmetic processing section C arithmetically calculates a target engine output torque (or a desired engine-power output) $tT_e$ on the basis of the target driving torque $tT_d$, the actual speed-change ratio $R_{oi}$, and a ratio ($N_i/N_e$) of the rotational speed ($N_i$) of the output side of the engagement/disengagement device (the electromagnetic clutch 14 in the embodiment shown in FIG. 2) to the rotational speed ($N_e$) of the input side of the engagement/disengagement device. The previously-noted ratio ($N_i/N_e$) is generally referred to as a "speed ratio" of the engagement/disengagement device. Concretely, the target engine output torque $tT_e$ is obtained by the following expression (1).

$$tT_e = tT_d/(K_1 \times R_{oi} \times R_{trq}).$$

where $K_1$ denotes a conversion constant required for converting a driving torque into an output-shaft torque of the CVT, and $R_{trq}$ denotes a torque ratio of an output-shaft torque (simply an output torque) of the engagement/disengagement device to an input-shaft torque (simply an input torque) of the same.

Figure 4B:
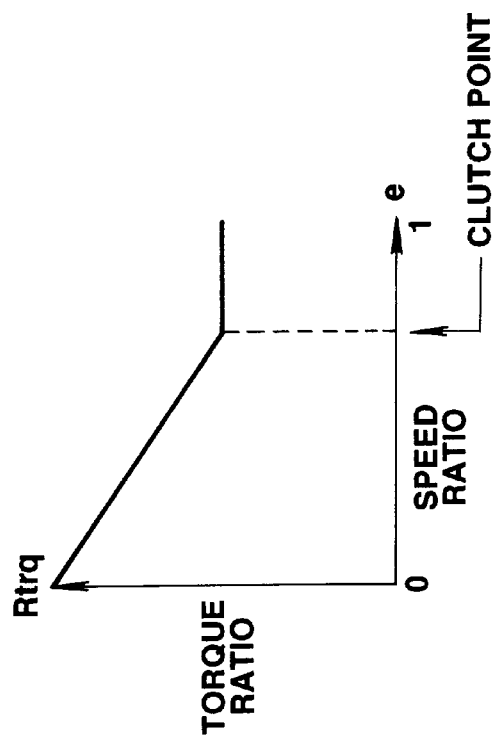
FIG. 4B is a characteristic map showing the relationship between a torque ratio ($R_{trq}$) and a speed ratio (e), when a lock-up clutch of a lock-up torque converter is selected as the engagement/disengagement device.
Figure 4A:
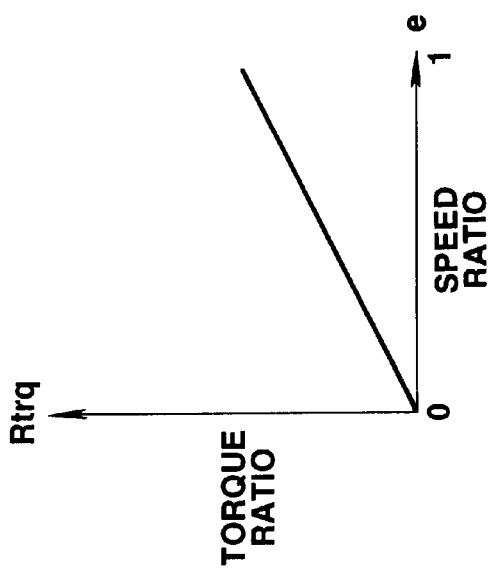
FIG. 4A is a characteristic map showing the relationship between a torque ratio ($R_{trq}$) and a speed ratio ($e=N_i/N_e$), when a so-called start clutch (e.g., an electromagnetic clutch) is selected as an engagement/disengagement device disposed between the engine and the CVT.

The torque ratio $R_{trq}$, variable depending on the speed ratio ($N_i/N_e$), is obtained by a characteristic map shown in FIG. 4A when the engagement/disengagement device is an electromagnetic clutch 14. As seen in FIG. 4A, when the electromagnetic clutch 14 is used as the engagement/disengagement device, the torque ratio ($R_{trq}$) of the out-put shaft torque to the input-shaft torque of the clutch 14 tends to increase essentially in proportion to an increase in the speed ratio ($e = N_i/N_e$) of the rotational speed ($N_i$) of the output side of the clutch 14 to the rotational speed ($N_e$) of the input side of the clutch 14, because friction loss tends to reduce as the engagement force of the clutch 14 increases. On the other hand, if the engagement/disengagement device is a lock-up clutch of a lock-up torque converter, the torque ratio $R_{trq}$ is obtained by a characteristic map (or a torque converter characteristic curve, often called a "torque-converter performance curve") shown in FIG. 4B. As seen in FIG. 4B, when the lock-up torque converter is used as the engagement/disengagement device, the increase in torque produced in the torque converter gradually drops off until the torque ratio $R_{trq}$ of output torque to input torque becomes 1:1. The point where the torque ratio $R_{trq}$ just becomes 1:1 is generally referred to as a "clutch point" or a "change-over point".

At the change-over point, at which a one-way clutch enables a stator (a reaction member) to begin to rotate forwards,the torque converter unit commences to function just like a fluid coupling. For the reasons discussed above, the left-hand zone of the clutch point is often called as a "torque converter range", whereas the right-hand zone of the clutch point is often called as a "fluid coupling range". The target throttle opening arithmetic processing section D receives two input informational data, namely the target engine output torque $tT_e$ determined by the arithmetic processing section C and the engine speed $N_e$ extracted from the crank angle sensor signal. The target throttle opening arithmetic processing section D arithmetically calculates a target throttle opening tTPS, on the basis of the target engine output torque $tT_e$ and the engine speed $N_e$. The previously-noted continuously variable automatic transmission (CVT) 9 is feedback controlled by the control unit 2, so that the speed-change ratio $R_{oi}$ is adjusted toward the target speed-change ratio $tR_{oi}$ calculated by the arithmetic processing section B. On the other hand, the electronically-controlled throttle 7 is feedback controlled by the control unit 2, so that the actual throttle opening TPS is adjusted toward the target throttle opening tTPS.

As discussed above, in the integrated control system of the embodiment, the target driving torque $tT_d$ is arithmetically calculated or retrieved from the first preprogrammed characteristic map indicative of the relationship among the accelerator operating amount APS, the vehicle speed VSP, and the target driving torque $tT_d$, whereas the target speed-change ratio $tR_{oi}$ is arithmetically calculated or retrieved from the second preprogrammed characteristic map representative of the relationship among the accelerator operating amount APS, the vehicle speed VSP, and the target speed-change ratio $tR_{oi}$. The first and second preprogrammed characteristic maps are not mutually related to each other. Thus, the first preprogrammed characteristic map (a target-driving-torque characteristic map having a great influence on a better drivability of the vehicle) and the second preprogrammed characteristic map (a target speed-change-ratio characteristic map having a great influence on an improved fuel economy) can be tuned or altered independently of each other. As a consequence, it is possible to easily balance both enhanced drivability and improved fuel consumption, because of the independent setting or tuning of the target driving torque $tT_d$ and the target speed-change ratio $tR_{oi}$. Additionally, in the embodied control system, the target engine output torque $tT_e$ is arithmetically calculated on the basis of the speed ratio ($e=N_t/N_e$) of the engagement/disengagement device (the electromagnetic clutch 14) as well as the calculated target driving torque $tT_d$ and the actual speed-change ratio $R_{oi}$. Thus, the target engine output torque $tT_e$ can be properly compensated for, depending on the operating condition of the engagement/disengagement device, such as the electromagnetic clutch 14 or the lock-up clutch of the lock-up torque converter. Therefore, it is possible to provide a high-accuracy engine output power control (i. e., a high-accuracy driving-torque control), even when the engagement/disengagement device (the releasable coupling device) is disengaged and thus there is the difference between relative speed between input and output shafts of the engagement/disengagement device. That is, according to the integrated control system of the embodiment, when a so-called start clutch (an electromagnetic clutch) or a lock-up clutch of a so-called lock-up torque converter is used as an engagement/disengagement device for a steplessly variable automatic transmission, it is possible to precisely compensate for the engine output power, depending on a slip rate of the engagement/disengagement device.

Figure 6:
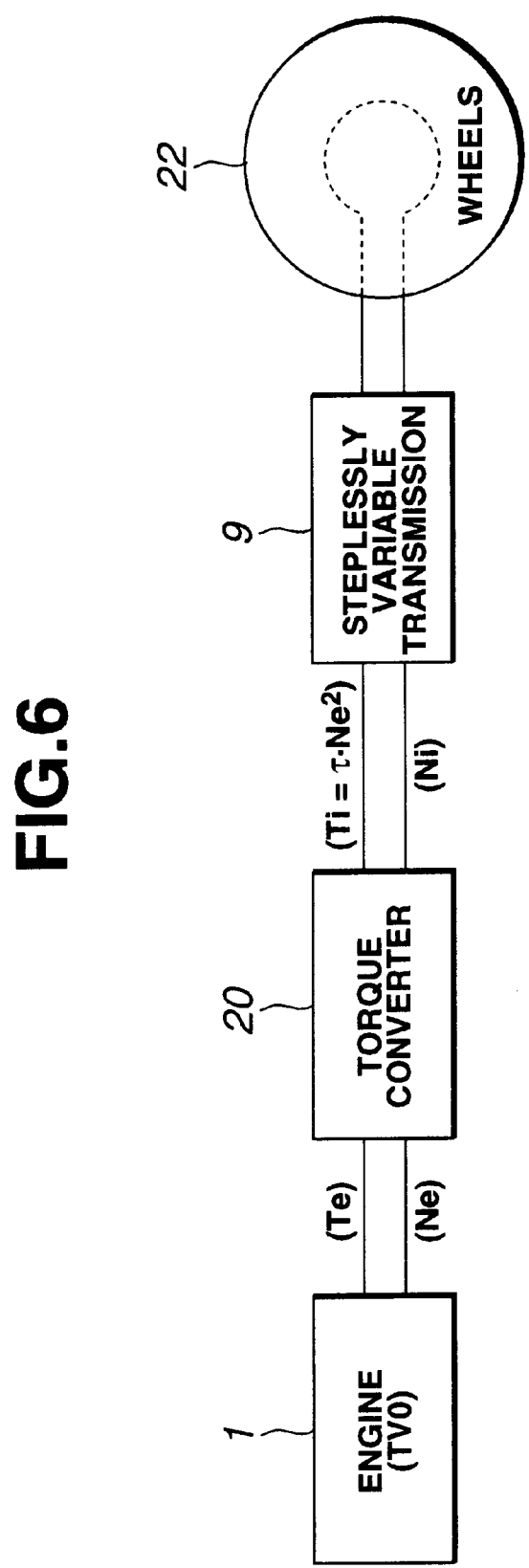
FIG. 6 is a schematic block diagram illustrating a standard power train, in case that the lock-up torque converter is used as the engagement/disengagement device.
Figure 7:
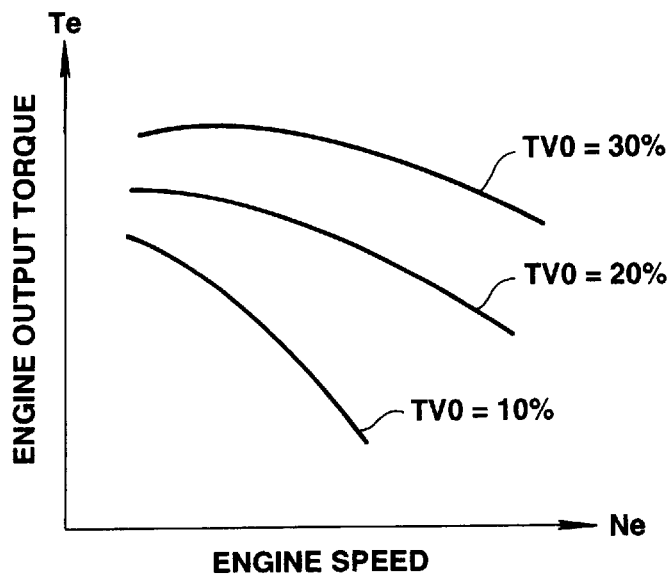
FIG. 7 is a characteristic map showing the correlation among a throttle opening (TVO), an engine speed ($N_e$), and an engine output torque ($T_e$).
Figure 8:
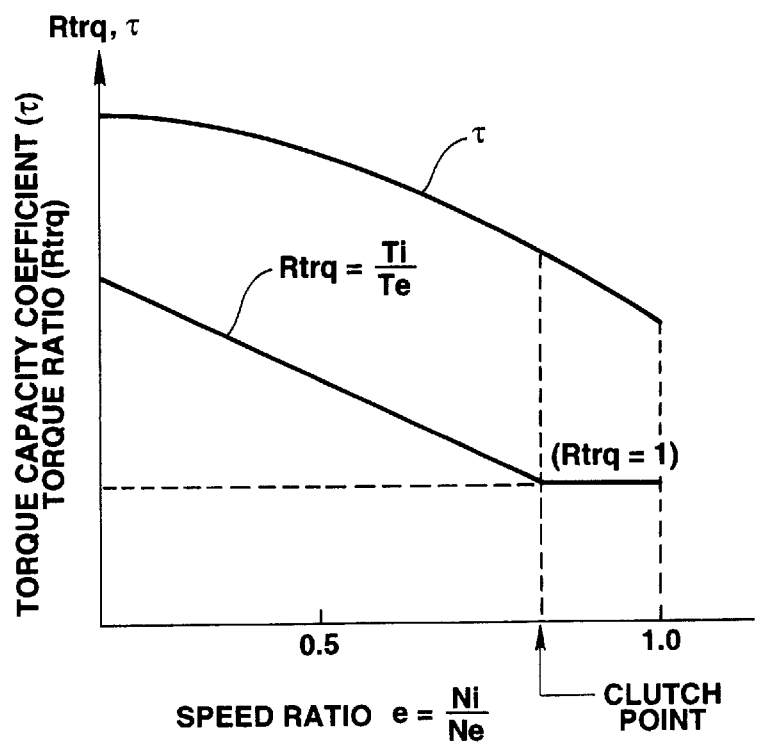
FIG. 8 is a characteristic map showing the torque-ratio ($R_{trg}$) versus speed-ratio (e) characteristic, and the torque-capacity coefficient ($\tau$) versus speed ratio (e) characteristic.

Referring now to FIG. 5, there is shown details of the back-ground routine for the automatic driving torque control (or the automatic engine output power control) and the automatic speed-change ratio control of the automatic transmission (or the automatic pulley ratio control of the CVT 9), executed by the integrated control system, in case that a lock-up torque converter is disposed between the engine and the CVT 9 as the engagement/disengagement device. The routine shown in FIG. 5 is executed as time-triggered interrupt routines to be triggered every predetermined sampling time intervals. The details of the back-ground routine for the automatic driving torque control and the automatic speed-change ratio control of the automatic transmission will be fully described later in accordance with the flow chart of FIG. 5. As seen in FIG. 6, the engine output torque $T_e$ (or a torque-converter input torque) is converted into a torque-converter output torque $T_t(=\tau \cdot N_e^2)$ and at the same time the engine speed $N_e$ (or a torque-converter input speed) is changed to a torque-converter output speed $N_t$ by means of the torque converter 20. The CVT 9 in the power train can provide various speed-change ratios (gear ratios or pulley ratios) between the engine 1 and the drive wheels 22. Prior to detailed explanation of the program shown in FIG. 5, the fundamental principle of the automatic driving torque control (or the automatic engine output power control) and the automatic speed-change ratio control of the automatic transmission (or the automatic pulley ratio control of the CVT 9) is discussed hereunder by reference to FIGS. 7 through 10. A general relationship among the engine output torque $T_e$, the engine speed $N_e$, and the throttle opening TVO (or TPS) is illustrated in FIG. 7. As seen in FIG. 7, the engine output torque $T_e$ can be univocally determined depending on the actual throttle opening TVO (or TPS) of the electronically-controlled throttle 7 (detected by the throttle sensor) and the actual engine speed $N_e$ (detected by the crank angle sensor 4). The lock-up torque converter 20 accommodates therein a lock-up clutch. In a conventional manner, the torque converter lockup clutch is operatively arranged between a torque-converter input element (e.g., a pump impeller) and a torque-converter output element (e.g., a turbine runner). The pump impeller is connected to the engine output shaft (engine crankshaft) via a torque-converter cover and thus having a driven connection with the engine. On the other hand, the turbine runner is connected to the input shaft of the steplessly variable automatic transmission 9. Turbine-runner wheels and impeller wheels are arranged to be opposed to each other. A stator (a reaction member) is disposed between the impeller and the turbine through a one-way clutch which supports the stator to permit torque-converter rotation (stator rotation) in one rotational direction. The lock-up torque converter 20 has an apply chamber to which an apply pressure is applied, and a release chamber to which release pressure is applied. The lock-up clutch is controllable by a differential pressure between the apply and release pressures to operate at either one of three operational zones or modes, namely an open converter zone where the lock-up clutch is released, a slip lock-up zone where the lock-up clutch is partially engaged, and a full lock-up zone where the lock-up clutch is strongly fully engaged. The three operational zones are predetermined usually depending on the vehicle speed VSP and the throttle opening TVO. The construction of the lock-up torque converter forms no part of the present invention, typical details of such a lock-up torque converter being set forth, for example, in U.S. Pat. No. 5,152,386 issued Oct. 6, 1992 to Hiroyuki Imamura, the teachings of which are hereby incorporated by reference. The lock-up clutch of the lock-up torque converter 20 is operated in the open converter zone, the torque converter exhibits a typical torque-converter performance curve as shown in FIG. 8. As clearly seen in FIG. 8, a torque-capacity coefficient $\tau$ of the capacity of torque transmitted to and absorbed in the torque converter 20, and a torque ratio $R_{trq}$ ($=T_i/T_e$) of the torque-converter output torque ($T_i$) to the torque-converter input torque ($T_e$) vary depending on the speed ratio e ($=N_i/N_e$) of the torque-converter output speed ($N_i$) to the torque-converter input speed ($N_e$). In other words, each of the absorbed torque-capacity coefficient $\tau$ and the torque ratio $R_{trq}$ can be determined depending on the speed ratio e. Also, the absorbed torque $T_c$ of the torque converter 20 is represented as the product of the absorbed torque-capacity coefficient $\tau$ and the square ($N_e^2$) of the engine speed $N_e$, as follows.

$$Tc=\tau \times N_e^2$$

Figure 9:
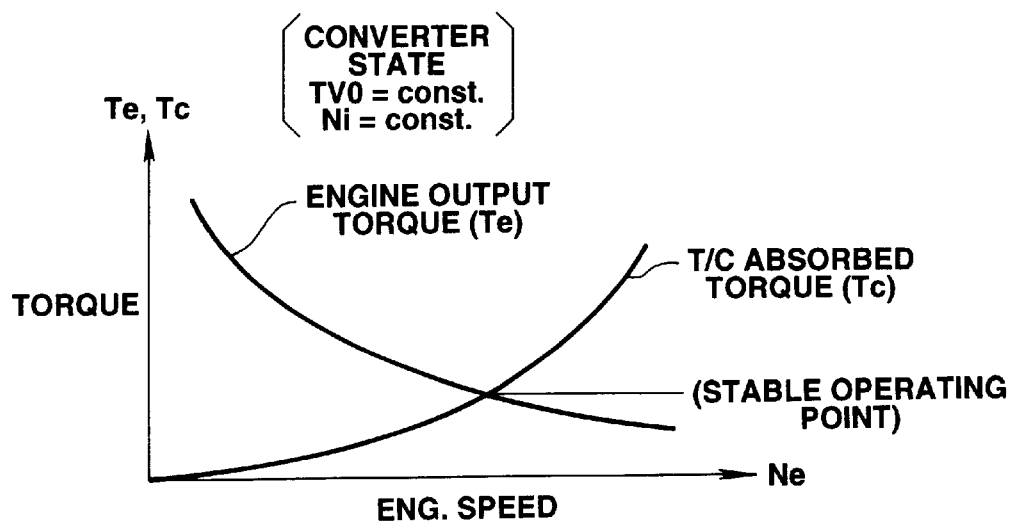
FIG. 9 is a characteristic map showing variations in an engine output torque ($T_e$) and a torque-converter absorbed torque ($T_c$), under a specified condition where the lock-up torque converter is operating at its open converter operating mode, the throttle opening (TVO) is maintained constant at one specified throttle opening (generally represented by a percentage), and the transmission input-shaft rotational speed ($N_i$) is maintained constant at a specified input rotational speed.

As may be appreciated, under transient operating conditions (or in the unstable state) of the engine and the power train, where the engine output torque (i.e., the torque-converter input torque) $T_e$ and the absorbed torque $T_c$ of the torque converter are different from each other, the torque-converter input speed $N_e$ varies owing to the torque difference ($T_e-T_c$) between the torque-converter input torque $T_e$ and the absorbed torque $T_c$. As can be appreciated from the characteristic curves shown in FIG. 7, the variation in the torque-converter input speed $N_e$ results in a change in the engine output torque $T_e$, until the combined operating point of the torque-converter input speed $N_e$ and the engine output torque $T_e$ is shifted to a new stable operating point where the previously-noted torque difference ($T_e-T_c$) becomes zero and thus the engine/power-train is in a stable state (or a steady state). In the open converter zone of the lock-up clutch of the torque converter, as shown in FIG. 9, the engine output torque $T_e$ and the absorbed torque $T_c$ vary depending on the engine speed $N_e$, for each combination of the throttle opening TVO (or TPS) and the transmission input speed (the torque-converter output speed) $N_i$. FIG. 9 shows one example of engine-speed ($N_e$) versus engine output torque ($T_e$) and engine-speed ($N_e$) versus torque-converter (T/C) absorbed torque ($T_c$) characteristics under a specified condition where the throttle opening TVO is fixed to a certain value and the transmission input speed $N_i$ is fixed to a certain value. In FIG. 9, the intersection point ($T_e=T_c$) of the engine-speed ($N_e$) versus engine output torque ($T_e$) characteristic curve and the engine-speed ($N_e$) versus torque-converter absorbed torque ($T_c$) characteristic curve corresponds to a stable combined operating point of the torque-converter input speed $N_e$ (or the transmission input speed $N_i$) and the engine output torque $T_e$. The stable combined operating point of the torque-converter input speed $N_e$ (or the transmission input speed $N_i$) and the engine output torque $T_e$ will be hereinafter referred to simply as a "stable operating point of the engine". When the current throttle opening TVO of the electronically-controlled throttle 7 is read through the ongoing arithmetic processing of FIG. 5, and the transmission input speed $N_i$ is also read through the ongoing processing of FIG. 5, a stable operating point of the engine can be univocally determined or retrieved from the characteristic map as shown in FIG. 9, under a given combination of the throttle opening TVO and the transmission input speed $N_i$ derived through the routine of FIG. 5. Then, the transmission input torque $T_i$ can be univocally determined or derived from the equation $T_i=R_{trq}\times T_e$, on the basis of the engine output torque $T_e$, retrieved from the map shown in FIG. 9, and the torque ratio $R_{trq}$, retrieved from the speed ratio e ($=N_i/N_e$) of the torque converter, because the torque ratio $R_{trq}$ is obtained as a function f(e) of the speed ratio e (see FIG. 8).

Hereupon, when the target driving torque $tT_d$ has been already determined, for example, by means of the target driving-torque arithmetic processing section A (see FIG. 3), the product ($tT_d \times N_o$) of this target driving torque $tT_d$ (regarded as the transmission output torque) and the axle driveshaft rotational speed (or the transmission output speed $N_o$) is equal to the product ($T_i \times N_i$) of the transmission input torque ($T_i$) and the transmission input speed ($N_i$). This is because the transmission output shaft power is equal to the transmission input shaft power, on the assumption that the efficiency of torque transmission of the power train containing the transmission 9 is 100%, as a matter of convenience. From the viewpoint described above, in order to automatically control the engine output power (the throttle opening TVO of the electronically-controlled throttle) and the speed-change ratio $R_{oi}$ of the CVT 9 and consequently to adjust the engine operating condition toward an optimal fuel-consumption rate, while satisfying a required transmission output shaft power (obtained as the product ($tT_d \times N_o$) of the target driving torque $tT_d$ and the transmission output speed $N_o$), first of all, it is necessary to select all of combinations of stable operating points {($T_{e1}$, $N_{e1}$), ($T_{e2}$, $N_{e2}$), ($T_{e3}$, $N_{e3}$), ... }, capable of producing the required transmission output shaft power. Thereafter, out of the selected or detected stable operating points, the best stable combined operating point, capable of providing the best (or the lowest) fuel consumption rate while producing the required transmission output shaft power (or the target driving torque $tT_d$), is selected by virtue of a preprogrammed engine fuel consumption rate characteristic map. This map is representative of the relationship among the throttle opening TVO, the engine speed $N_e$, and the engine fuel consumption rate. This fuel consumption rate characteristic map can be determined experimentally for every sorts of engines. In this manner, the best stable combined operating point can be selected. Thereafter, the selected engine output torque $T_e$ (or the transmission output shaft power) at the best stable operating point, can be attained by way of a feedback control (an electronic control) of the throttle opening of the electronically-controlled throttle 7. Simultaneously, the selected transmission input speed $N_i$ at the best stable operating point can be attained by way of an automatic speed-change ratio control. In this manner, it is possible to produce the target driving torque $tT_d$, while realizing or fulfilling the lowest fuel consumption rate.

Returning to FIG. 5, for example, when the lock-up torque converter 20 is disposed between the engine 1 and the CVT 9 as the engagement/disengagement device, the integrated control system of the invention operates as follows.

In step S11, first of all, the current transmission input speed $N_i$ is read.

In step S12, the current throttle opening TVO of the electronically-controlled throttle 7 is read.

In step S13, the current engine speed $N_e$ is read.

In step S14, a speed ratio e is arithmetically calculated or derived from the following expression, on the basis of the transmission input speed $N_i$ and the engine speed $N_e$ read through steps S11 and S13.

$$e=N_i/N_e$$

In step S15, a torque-converter absorbed torque coefficient τ is retrieved from the characteristic map shown in FIG. 8, on the basis of the speed ratio e calculated through step S14.

In step S16, a torque-converter absorbed torque $T_c$ is arithmetically calculated or derived from the following expression, on the basis of the retrieved torque-converter absorbed torque coefficient τ and the current engine speed $N_e$ read at step S13.

$$T_c = \tau \times N_e^2$$

In step S17, an engine output torque $T_e$ is retrieved from the characteristic map as shown in FIG. 7, on the basis of the throttle opening TVO and the engine speed $N_e$ read through steps S12 and S13.

In step S18, a test is made to determine whether a stable operating point, where the torque difference $(T_e-T_c)$ between the engine output torque $T_e$ and the torque-converter absorbed torque $T_c$ is zero, exists. Actually, it is difficult to exactly determine as to whether the torque difference $(T_e-T_c)$ is zero. In lieu thereof, it will be appreciated that the conformity $(T_e=T_c)$ between the engine output torque $T_e$ and the torque-converter absorbed torque $T_c$, may be determined by way of a specific timing when the sign of the torque difference $(T_e-T_c)$ is changed from positive to negative or vice versa. If the stable operating point is not found out (or detected) in step S18, steps S14 through S18 are repeated again. After repetition of the flow from step S14 to step S18, when the stable operating point has been detected or found out, step S19 occurs.

In step S19, a torque ratio $R_{trq}$ of the torque converter 20 is retrieved from the characteristic map of FIG. 8, on the basis of the speed ratio e calculated at step S14.

In step S20, a transmission input torque $T_i$ is arithmetically calculated by the following expression, on the basis of the torque ratio $R_{trq}$ retrieved at step S19 and the engine output torque $T_e$ retrieved at step S17.

$$T_i = R_{trq} \times T_e$$

In step S21, a transmission input shaft power is arithmetically calculated as the product $(N_i \times T_i)$ of the transmission input speed $N_i$ and the transmission input torque $T_i$. On the previously-noted assumption that the efficiency of torque transmission of the power train containing the transmission 9 is 100%, the transmission input shaft power $(N_i \times T_i)$ is equal to the transmission output shaft power $(tT_d \times N_o)$. The relational expression $\{(N_i \times T_i)=(tT_d \times N_o)\}$ between the transmission input shaft power $(N_i \times T_i)$ and the transmission output shaft power $(tT_d \times N_o)$ is represented as an equality $T_i=(tT_d \times N_o)/N_i$. On the other hand, the torque ratio $R_{trq}$ is represented as a ratio $T_i/T_e$ of the torque-converter output torque $T_i$ to the torque-converter input torque $T_e$, and then $T_e=T_i/R_{trq}$. By substitution of $T_i=(tT_d \times N_o)/N_i$ into the equality $T_e=T_i/R_{trq}$, the target engine output torque $tT_e$ is represented as $tT_e=\{(tT_d \times N_o)/N_i\}/R_{trq}$. That is, the target engine output torque $tT_e$ is represented as $tT_e=(N_o/N_i) \cdot (1/R_{trq})$, that is, $tT_e=tT_d/R_{oi}/R_{trq}$. Actually, the efficiency of torque transmission of the power train containing the transmission 9 is not 100%, the conversion constant $K_1$ required for converting the driving torque into the output torque of the CVT 9 must be considered. Accounting for the conversion constant $K_1$, the above-mentioned equation $tT_e=tT_d/R_{oi}/R_{trq}$ is identical to the previously-discussed expression (1). In this manner, in the embodiment shown in FIGS. 5–10, the speed ratio e as well as the target driving torque $tT_d$ and the speed-change ratio $R_{oi}$, are used to arithmetically calculate the target engine output torque $tT_e$. In the embodiment shown in FIG. 5, in addition to the check for the stable operating point of the engine/torque-converter, a check for an engine fuel-consumption rate is simultaneously made in accordance with steps S22, S23 and S24, as described hereunder. To attain the target driving torque $tT_d$ based on the transmission input shaft power $(N_i \times T_i)$ calculated at step S21, while reducing the engine fuel consumption rate as low as possible, the best stable combined operating point of the engine output torque $T_e$ and the transmission input speed $N_i$ is selected as follows.

In step S22, an engine fuel consumption rate at the stable operating point detected through the ongoing arithmetic processing, is retrieved from the predetermined fuel consumption rate characteristic map representative of the relationship among the throttle opening TVO, the engine speed $N_e$, and the fuel consumption rate. In step S23, a data array composed of the transmission input shaft power $(N_i \times T_i)$, the engine fuel consumption rate (unit: g/PS·H), the transmission input speed $N_i$, and the engine output torque $T_e$, all obtained through the current routine (or the ongoing arithmetic calculation), is stored in the memory (RAM) of the control unit 2. Retrieval of the stable operating point, as discussed above, is repeated for each combination of the throttle opening TVO and the transmission input speed $N_i$. In this manner, retrieval or detection of the stable operating point is made for all of the combinations of the two parameters TVO and $N_i$.

In step S24, the data array is re-arranged for every transmission input shaft power $(N_i \times T_i)$ in order of lower fuel consumption rate (unit: g/PS·H).

In step S25, with respect to the transmission input shaft power corresponding to the target driving torque, the best stable combined operating point, enough to produce the lowest fuel consumption rate, is selected from a plurality of stored data arrays as the lead data array. Based on the best combination of the desired engine output torque $T_e$ and the desired transmission input speed $N_i$ at the best stable operating point, the throttle opening is feedback controlled in a manner so as to satisfy the desired engine output torque $T_e$ by way of the automatic throttle control performed with respect to the electronically-controlled throttle 7. At the same time, the speed-change ratio $R_{oi}$ of the transmission 9 is feedback controlled in a manner so as to satisfy the desired transmission input speed $N_i$ by way of the automatic transmission ratio control (or the automatic pulley ratio control of the CVT).

Figure 10:
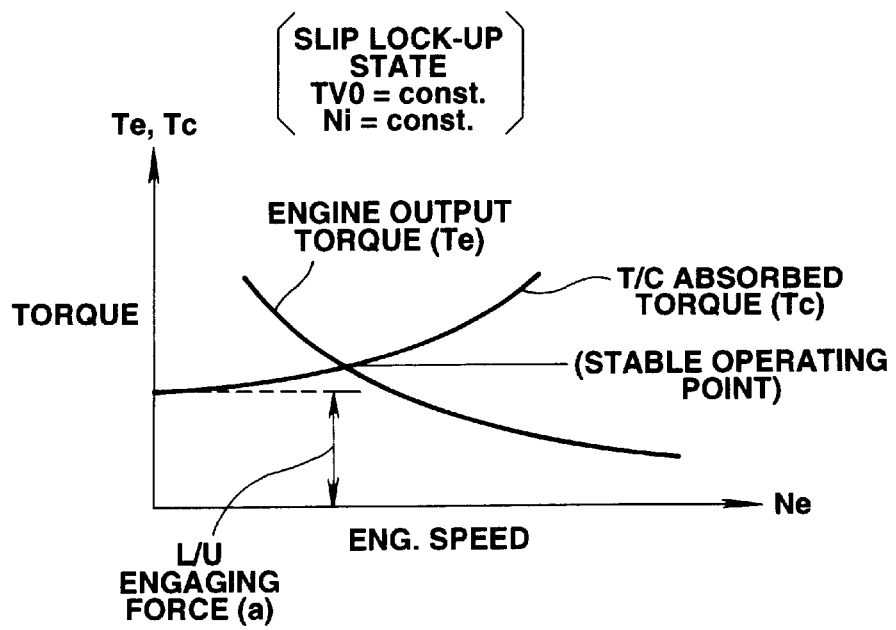
FIG. 10 is a characteristic map showing variations in the engine output torque ($T_e$) and the torque-converter absorbed torque ($T_c$), under another specified condition where the lock-up torque converter is operating at its slip lock-up operating mode, the throttle opening (TVO) is maintained constant at a specified throttle opening, and the transmission input-shaft rotational speed ($N_i$) is maintained constant at a specified input rotational speed.

Referring now to FIG. 10, there is shown one example of engine-speed $(N_e)$ versus engine output torque $(T_e)$ and engine-speed $(N_e)$ versus torque-converter (T/C) absorbed torque $(T_c)$ characteristics under a specified condition where the throttle opening TVO is fixed to a certain value and the transmission input speed $N_i$ is fixed to a certain value, in the slip lock-up zone of the lock-up clutch of the torque converter. In FIG. 10, the intersection point $(T_e=T_c)$ of the engine-speed $(N_e)$ versus engine output torque $(T_e)$ characteristic curve and the engine-speed $(N_e)$ versus torque-converter absorbed torque $(T_c)$ characteristic curve corresponds to a stable combined operating point of the torque-converter input speed $N_e$ and the engine output torque $T_e$. As compared with the characteristic map shown in FIG. 9, the engine-speed $(N_e)$ versus T/C absorbed torque $(T_c)$ characteristic curve shown in FIG. 10 is drawn upwards by an engaging force (a) of the lock-up clutch. In other words, the engine-speed ($N_e$) versus T/C absorbed torque ($T_c$) characteristic curve is increasingly compensated for by a force of engagement of the lock-up clutch of the lock-up torque converter, during the slip lock-up mode.

As will be appreciated from the above, when the integrated control system of the invention is adopted to an automotive vehicle with an electronically-controlled controlled engine and a steplessly variable automatic transmission connectable to the engine via a lock-up torque converter, an engine fuel consumption rate can be effectively reduced by way of the proper automatic speed-change control combined with the automatic engine output power control, while producing the target driving torque, irrespective of the operational zones, namely the open converter zone, the slip lock-up zone, and the full lock-up zone.

In the shown embodiment, although the transmission output speed sensor 16 is used as the vehicle speed sensor, a transmission output speed sensor and a vehicle speed sensor are provided independently of each other. For example, the vehicle speed VSP may be estimated as a select-HIGH speed data of four wheel speed data.

In the embodiment, although the belt type CVT is used, other types of a steplessly variable transmission, such as a toroidal CVT can be used. Typical details of such a toroidal CVT, being set forth, for example, in U.S. Pat. No. 4,955,246 issued Sep. 11, 1990 to Masaki Nakano and assigned to the assignee of the present invention, the teaching of which are hereby incorporated by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An integrated control system for both an electronically-controlled engine and a steplessly variable automatic transmission, comprising:

an engine-torque control actuator capable of variably adjusting an engine output torque, irrespective of depression of an accelerator;

a steplessly variable automatic transmission disposed between the electronically-controlled engine and an axle driveshafts, for steplessly changing a speed-chance ratio;

an accelerator sensor for detecting an accelerator operating amount;

a vehicle speed sensor for detecting a vehicle speed;

an engine speed sensor for detecting an engine speed;

a transmission input speed sensor for detecting a transmission input speed;

a transmission output speed sensor for detecting a transmission output speed;

a speed-change ratio arithmetic processing section for calculating the speed-change ratio as a ratio of the transmission input speed to the transmission output speed;

a target driving torque arithmetic processing section for retrieving a target driving torque, based on both the accelerator operating amount and the vehicle speed, from a first predetermined characteristic map;

a target speed-change ratio arithmetic processing section for retrieving a target speed-change ratio, based on both the accelerator operating amount and the vehicle speed, from a speed predetermined characteristic map;

a target engine output torque arithmetic processing section for calculating a target engine output torque, based on all of the target driving torque, the speed-change ratio, and a speed ratio of the transmission input speed to the engine speed;

an arithmetic processing section for calculating a desired value of a control variable for said engine-torque control actuator, based on the target engine output torque and the engine speed;

a first feedback control section for feedback-controlling said engine-torque control actuator, so that said control variable of said engine-torque control actuator is adjusted toward said desired value;

a second feedback control section for feedback-controlling said automatic transmission, so that the speed-change ratio is adjusted toward the target speed-change ratio; and an engagement-and-disengagement device disposed between said steplessly variable automatic transmission and the electronically-controlled engine, wherein said engagement-and-disengagement device comprises a lock-up torque converter accommodating therein a lock-up clutch, wherein said engine-torque control actuator comprises a throttle actuator for changing an angular position of an electronically-controlled throttle, and the control variable is a throttle opening, wherein said lock-up torque converter is operable at either one of three operational modes, namely an open converter mode where the lock-up clutch is released, a slip lock-up mode where the lock-up clutch is partially engaged, and a full lock-up mode where the lock-up clutch is fully engaged, and which further comprises a stable operating point arithmetic processing section for detecting a stable combined operating point of an engine output torque and the transmission input speed, at which stable combined operating point a torque difference between the engine output torque and a torque-converter absorbed torque becomes zero, for each combination of the throttle opening and the transmission input speed when said lock-up torque converter operates at either one of the open converter mode and the slip lock-up mode, and a best stable operating point arithmetic processing section for selecting the best stable combined operating point, capable of providing the lowest fuel consumption rate while producing the target driving torque, out of the stable combined operating points detected.

2. The integrated control system as claimed in claim 1, wherein said first feedback control section feedback-controls said throttle actuator of the electronically-controlled throttle, so that the engine output torque is adjusted toward a target engine output torque at the best stable combined operating point, and wherein said second feedback control section feedback-controls said automatic transmission, so that the transmission input speed is adjusted toward a target transmission input speed at the best stable combined operating point.

3. The integrated control system as claimed in claim 2, wherein the best stable combined operating point is selected by virtue of a preprogrammed engine fuel consumption rate characteristic map representative of the relationship among the throttle opening, the engine speed, and the engine fuel consumption rate.

4. The integrated control system as claimed in claim 3, wherein the stable combined operating point of the engine output torque and the transmission input speed is derived as a point of intersection of an engine-speed versus engine output torque characteristic curve and an engine-speed versus torque-converter absorbed torque characteristic curve, and wherein, as compared to the open converter mode, the engine-speed versus torque-converter absorbed torque characteristic curve at the slip lock-up mode is increasingly compensated for by a force of engagement of the lock-up clutch of said lock-up torque converter.

5. The integrated control system as claimed in claim 1, wherein said steplessly variable automatic transmission comprises a belt type continuously variable automatic transmission having primary and secondary—driving and driven—pulleys whose effective diameters are continuously changeable, a segmented belt wound on both the primary and secondary pulleys, a driving-pulley hydraulic actuator responsive to a primary pressure for changing the effective diameter of said primary pulley, and a driven-pulley hydraulic actuator responsive to a secondary pressure for changing the effective diameter of said secondary pulley, so that the speed-change ratio is steplessly variable.

6. The integrated control system as claimed in claim 1, wherein said target engine output torque arithmetic processing section calculates said target engine output torque as follows:

$$tT_e = tT_d/(K_1 \times R_{oi} \times R_{trq})$$

where $K_1$ is a conversion constant for converting the target driving torque into an output torque of said automatic transmission, $R_{oi}$ is the speed-change ratio of said automatic transmission, and $R_{trq}$ is a torque ratio of an output torque of the engagement-and-disengagement device to an input torque of the engagement-and-disengagement device.

* * * * *